US008937641B1

(12) United States Patent
Rikoski

(10) Patent No.: US 8,937,641 B1
(45) Date of Patent: Jan. 20, 2015

(54) HOLOGRAPHIC MAP

(75) Inventor: Richard J. Rikoski, Alameda, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 892 days.

(21) Appl. No.: 12/798,169

(22) Filed: Mar. 15, 2010

Related U.S. Application Data

(60) Provisional application No. 61/216,567, filed on May 18, 2009, provisional application No. 61/216,566, filed on May 18, 2009.

(51) Int. Cl.
*H04N 5/89* (2006.01)

(52) U.S. Cl.
USPC .......................................................... 348/40

(58) Field of Classification Search
USPC ...................................... 348/40, 81
See application file for complete search history.

(56) References Cited

U.S. PATENT DOCUMENTS

| 3,606,516 | A | * | 9/1971 | Hirsch et al. ....................... 359/9 |
| 4,550,395 | A | * | 10/1985 | Carlson ......................... 369/103 |
| 5,214,581 | A | * | 5/1993 | Rhodes et al. ..................... 378/7 |
| 5,392,050 | A | * | 2/1995 | Guerci et al. ..................... 342/90 |
| 6,023,355 | A | * | 2/2000 | Bashaw et al. .................. 359/21 |
| 6,052,100 | A | * | 4/2000 | Soltan et al. ....................... 345/6 |
| 6,452,532 | B1 | * | 9/2002 | Grisham .................... 342/25 C |
| 6,757,086 | B1 | * | 6/2004 | Mori et al. ........................ 359/25 |
| 7,498,989 | B1 | * | 3/2009 | Volman .................. 343/700 MS |
| 7,796,809 | B1 | * | 9/2010 | Carder et al. .................. 382/154 |
| 2001/0038678 | A1 | * | 11/2001 | Grass et al. ......................... 378/4 |
| 2003/0048495 | A1 | * | 3/2003 | Vertoprakhov .................. 359/15 |
| 2008/0012850 | A1 | * | 1/2008 | Keating, III ................... 345/419 |
| 2008/0030819 | A1 | * | 2/2008 | Klug et al. ......................... 359/23 |
| 2008/0060034 | A1 | * | 3/2008 | Egnal et al. ..................... 725/105 |
| 2008/0130413 | A1 | * | 6/2008 | Bachelor et al. ............... 367/103 |
| 2008/0218588 | A1 | * | 9/2008 | Stetten ............................ 348/47 |
| 2009/0080317 | A1 | * | 3/2009 | Martinez ....................... 369/103 |
| 2009/0202919 | A1 | * | 8/2009 | Waldman et al. ................. 430/2 |
| 2012/0050832 | A1 | * | 3/2012 | Rosen et al. ..................... 359/25 |

FOREIGN PATENT DOCUMENTS

WO   WO 2007113469 A1 * 10/2007

* cited by examiner

*Primary Examiner* — Christopher S Kelley
*Assistant Examiner* — Jonathan Messmore
(74) *Attorney, Agent, or Firm* — James T. Shepherd

(57) ABSTRACT

A holographic map is formed of one or more holograms or images conforming to the open/closed aperture theorem and grazing angle compensated. A hologram can be thought of as the sum of all images over a range of angles, wherein the frequency and aspect information is coded into two dimensions. An open/closed aperture image is an image having all points in the image observed over the same range of angles. Grazing angle compensation projects the data onto a representation of the sea floor and the image is rescaled by the cosine (or secant) of the angle between a ray connecting the sonar to a point on the sea floor. A valid range of viewing aspects is defined. The images in the holographic map have both a frequency band and range of aspects that, after grazing angle compensation, describe all locations in the map.

8 Claims, 8 Drawing Sheets

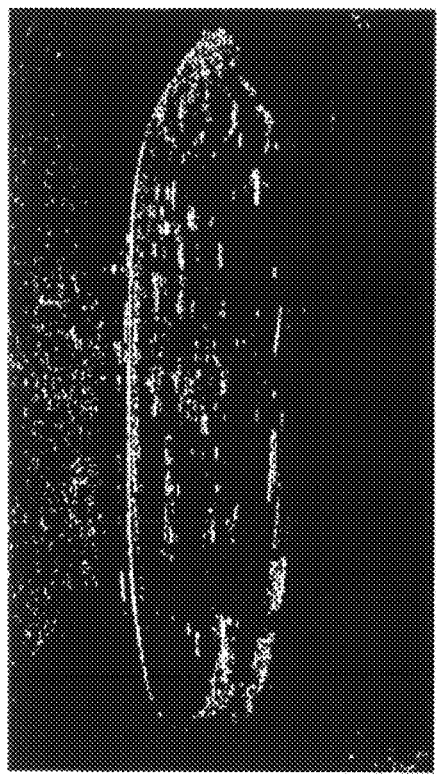
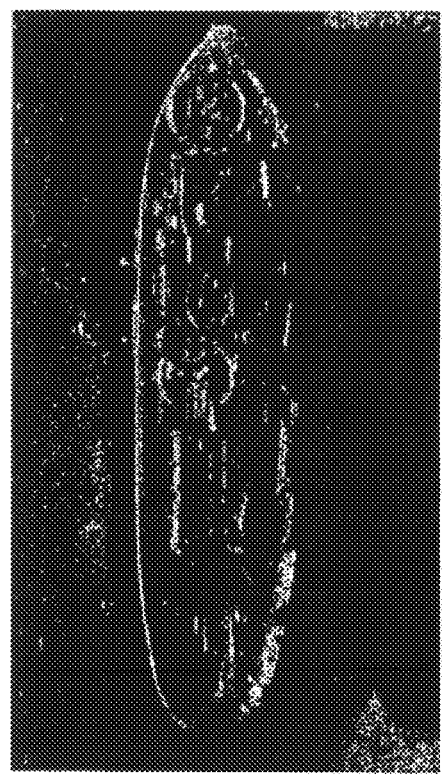
FIG. 5A            FIG. 5B
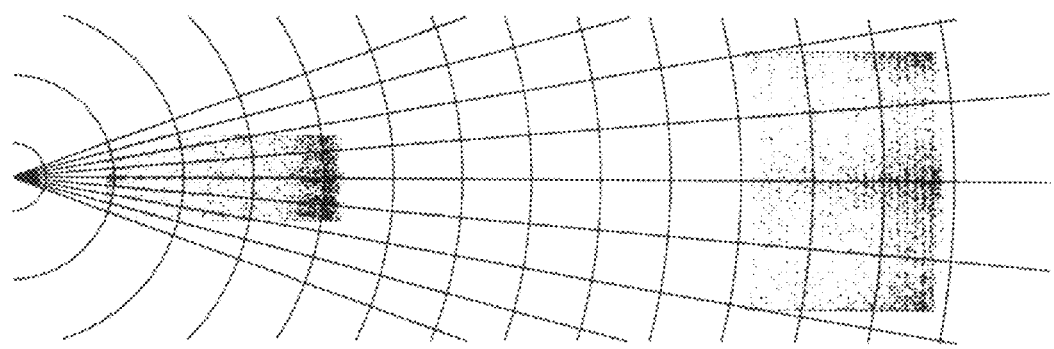
FIG. 5C

HOLOGRAPHIC MAP

CROSS REFERENCE TO OTHER PATENT APPLICATIONS

This patent application claims priority to U.S. Provisional Patent Application No. 61/216,567 filed on May 18, 2009, the contents of which are incorporated herein by reference in their entirety. This patent application is related to co-pending patent application entitled SYSTEM AND METHOD FOR SPATIALLY INVARIANT SIGNAL DETECTION, Ser. No. 12/454,486, filed on May 18, 2009, and Provisional Patent Application No. 61/216,566 entitled HOLOGRAPHIC NAVIGATION, filed on May 18, 2009, the contents of which are incorporated herein by reference in their entirety. These co-pending applications are by the same inventor as this application.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to holographic maps and more specifically to maps consisting of coherent imagery using well-defined aspect and frequency content to estimate position.

(2) Description of the Prior Art

As is known in the art, traditional maps describe relationships between phenomena and position. The two most common map types are contour, or field maps, and feature based maps. Contour or field maps relate the intensity of some phenomena to position. For instance, a topographical map relates elevation to position. This relationship can be represented as the function $E(x,y)$. Bathymetric and gravitometric maps have similar representations.

Feature based maps represent the world in terms of discrete landmarks. Although feature specific information can be encoded into the map (such as object type, color, texture, etc), the classical feature based map simply combines object locations into a state vector, with each coordinate pair corresponding to a distinct landmark, as shown in Equation 1.

$$M = \begin{bmatrix} x_{f1} \\ y_{f1} \\ x_{f2} \\ y_{f2} \\ \vdots \\ x_{fn} \\ y_{fn} \end{bmatrix} \quad [1]$$

Both of these approaches break down when using sonar images, because what is observed with sonar changes so dramatically with position and angle. A scene cannot be adequately described in terms of a single function $I(x,y)$. Nor can features be reliably extracted and recognized as part of a feature based representation.

To best understand the underwater scene, it is necessary to describe it using more variables. Each point on the bottom has a signature which is both aspect and frequency dependent. As such, a better representation might be $I(x,y,f,\theta)$, where f is frequency and e is the observation aspect. However, this representation is cumbersome because it requires populating a four-dimensional space.

What is needed is an approach that codes the frequency and aspect information into two dimensions. Such an approach would require less storage than a four dimensional representation.

SUMMARY OF THE INVENTION

It is therefore a general purpose and primary object of the present invention to provide a holographic map, wherein the frequency and aspect information is coded into two dimensions. The frequency and aspect content can be well-defined such that terrain reacquisition sonar can be designed and operated in such a manner that coherent correlation is possible.

A hologram can be thought of as the sum of all images over some range of angles. It requires less storage than the four dimensional representation, and is ideal for correlation. A holographic map can be formed of one or more holograms or images that conform to the open/closed aperture theorem and that have been grazing angle compensated, as will be explained in further detail hereinafter. The open/closed aperture theorem is described in more detail in co-pending patent application Ser. No. 12/454,486 entitled SYSTEM AND METHOD FOR SPATIALLY INVARIANT SIGNAL DETECTION, incorporated by reference above.

A closed radiative aperture surrounds a point p arbitrarily disposed within the closed aperture. Any radiation emitted from point p (including reflected radiation) will be incident upon the inner surface of the closed aperture. The net signal detected by the aperture is the point spread function of point p integrated over the inner surface, i.e. integrated over all points s on the inner surface. Consideration of this integral leads to the Closed Aperture Theorem.

If, for each point on the inner surface, one weights this integral by the cosine of the angle α between a normal and a position vector directed between points s and p, the integral becomes spatially independent of the position vector in the direction of the normal (i.e. the radial component of the position vector), and depends solely on the position on the inner surface of the closed aperture, not on the distance from s to p. Subject to the assumption that point p is far enough from the closed aperture that the spreading loss to the main lobe and side lobes of the point spread function are approximately equal, the radiative signal from point p detected by the closed aperture will be spatially invariant.

The spatial resolution of a typical sonar is about an inch; that of a radar on the order of a micrometer; an acoustical signal in a human the human body on the order of millimeters (n.b. ultrasound). Thus for practical purposes, the signal which the closed aperture receives from point p is unrelated to the location of p. This result is wholly independent of the shape of the closed aperture. For an aperture of any shape that completely encloses point p, radiation from point p would still be spatially invariant in the manner above described.

For the Open Aperture Theorem, consider a first aperture generally enclosing point p, but with a portion removed so as to permit lines of sight for point p outside of the aperture. Because radiation from point p can now escape the aperture, the Closed Aperture Theorem does not hold. However, because the theorem does hold independent of aperture geometry, any additional aperture that, in conjunction with the first aperture, would close the removed portion would again render detection of radiation from p spatially invariant.

This implies that all apertures sized and positioned to receive the identical radiation from point p as would an aperture plugging the removed portion must necessarily be radiatively identical with respect to point p. Thus any aperture sized and shaped to subtend the same solid angle having point p as its vertex, as is subtended by the removed portion (with point p as its vertex) must necessarily be radiatively equivalent to one another as concerns point p.

By way of further comment, to subtend the same solid angle means here more than simply containing the same number of steradians. It means that the aperture be sized and shaped to receive the same illumination from point p. To the extent one deviates from this, one deviates from both the Open and Closed Aperture Theorems, the deviation being, in effect, a source of noise to the process of signal detection. As an aperture moves farther away from a point of interest (such as p), simple geometry dictates that the change in solid angle the aperture subtends changes by increasingly small amounts, and the noise error thereby introduced decreases correspondingly. Thus at distances large compared to the dimensions of the aperture, one would expect solid angle mismatches to be negligible.

Quantitatively, if the mismatch is characterized by:

$$\Omega=(\text{area of solid angle overlap})/(\text{area desired to be overlapped}),$$

then for an aperture having an inherent signal to noise ratio, SNR, the signal to noise of the aperture SNR' having such a mismatch is:

$$SNR'=[\Omega*SNR/((1-\Omega)*SNR+1].$$

As overlap $\Omega$ becomes perfect, $\Omega=1$, SNR' goes to SNR, i.e. the aperture's signal to noise is unchanged, as one would expect. For no overlap at all, $\Omega=0$, SNR' goes to zero, and the aperture will receive no signal at all from point p. Because this mismatch becomes less pronounced at large distances, at such distances the cosine weighting provides the predominant benefit.

An ideal open/closed aperture image is an image where all points in the image are observed over the same range of angles. A suboptimal system observes points over different ranges of angles. Such images are typically formed by broadside, squinted, or circular Synthetic Aperture Sonars (SAS's).

Grazing angle refers to the angle between a ray connecting the sonar to a point on the sea floor. For a given sonar frequency, the spacing between peaks in the sound waves arriving at the sea floor gets closer together as the horizontal range increases. Thus, geometric relationships between objects on the sea floor are distorted.

Grazing angle compensation projects the data onto a representation of the sea floor. By rescaling the image by the cosine of the grazing angle (or alternately by the secant), it is possible to shift the frequencies and create a grazing angle invariant image. The simplest form of grazing angle compensation assumes a flat bottom and a sonar platform operating at a constant altitude. More advanced algorithms project the image onto terrain with relief, which scales the frequencies in a more complicated manner.

In addition to grazing angle compensation, a valid range of viewing aspects needs to be defined. If a target is viewed from different angles, the information about the target will lie along a different line in the frequency domain and the signals will not correlate.

Accordingly, the holographic map consists of one or more sonar images having both a frequency band and range of aspects that, after grazing angle compensation, describe all locations in the map.

In one embodiment, a holographic map is formed by one or more images that conform to the open/closed aperture theorem. The images are grazing angle compensated and both a frequency band and a range of aspects of the images describe all locations in the holographic map.

In one embodiment, the images are formed by a synthetic aperture sonar. The synthetic aperture sonar may be a one of a broadside, squinted; or circular synthetic aperture sonar. In one embodiment, the holographic map can be formed of a plurality of distinct holograms or a mosaicked hologram.

In one embodiment, a method of generating a holographic map includes the steps of forming an image conforming to the open/closed aperture theorem, grazing angle compensating the image, and defining a frequency band and a range of aspects of the image to describe all locations in the holographic map.

In one embodiment, the image is formed using a synthetic aperture sonar. In one embodiment, a plurality of images are formed and combined to form the holographic map. In one embodiment, a plurality of images are mosaicked to form the holographic map.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein:

FIGS. 5A-C illustrate synthetic aperture sonar images and spectra of a sunken tugboat;

DESCRIPTION OF THE INVENTION

Figure 1:
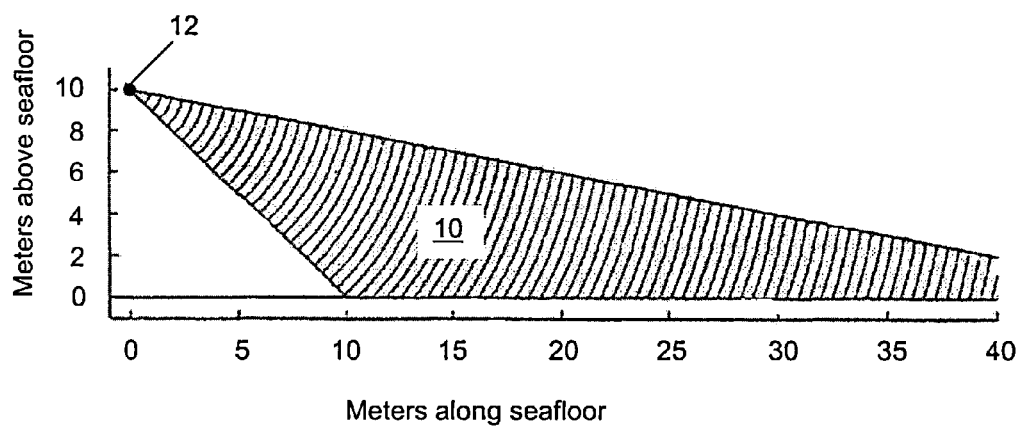
FIG. 1 illustrates a diagram showing grazing angles.

Presented herein is a new type of map for navigation using sonar or radar. Traditional representations used in feature based navigation are problematic when combined with sonar or radar systems because they require reliable feature detection and object recognition. If, instead, coherent image correlation is used, it is possible to recognize terrain without-detection or object recognition.

This approach requires a map which is well suited to image correlation. The map must have well defined frequency and aspect content such that terrain reacquisition sonar can be designed and operated in such a manner that coherent correlation is possible. The map can comprise images that conform to the open/closed aperture theorem and that have been grazing angle compensated, or images created by open/closed apertures which are surfaces.

An ideal open/closed aperture image is an image where all points in the image are observed over the same range of angles (a suboptimal system observes points over different ranges of angles). These images are typically formed by broadside, squinted, or circular Synthetic Aperture Sonars (SAS's).

Grazing angle compensation projects the data onto a representation of the sea floor. This causes a scaling of frequencies. The simplest form of grazing angle compensation assumes a flat bottom and a vehicle operating at a constant altitude. More advanced algorithms project the image onto terrain with relief, which scales the frequencies in a more complicated manner.

A hologram codes the frequency and aspect information into two dimensions and is well suited for forming the above-described map. A hologram can be thought of as the sum of all images over some range of angles. It requires less storage than a four dimensional representation, and is ideal for correlation. Two holograms are correlated by multiplying their Fourier transforms and taking the inverse Fourier transform of the result. A hologram can be coherently correlated with a single image through the same process. Even though it is nearly impossible to correlate two sonar images, it is straightforward to correlate two sonar holograms or a sonar hologram and a sonar image.

A holographic map is a collection of holograms that are suitable for navigation. Navigation is accomplished by correlating images or holograms with the holographic map. A holographic map can be a collection of distinct holograms, a mosaicked hologram, or some combination of the two. In all cases, a holographic map is coherent.

In order to form a holographic map it is necessary to be able to form a hologram. To form a hologram, coherent echoes from a scene have to be gathered over some range of angles, points in the scene cannot be observed from only one aspect. Synthetic Aperture Sonars and Radars (SAS's and SAR's) are existing systems which form holograms, although they are typically referred to as SAS or SAR images. Their images (holograms) are suitable for this type of mapping. Accordingly, a holographic map consists of coherent imagery with well defined aspect and frequency content that can be used to estimate position.

Referring to FIG. 1, there is shown a diagram illustrating grazing angle. The horizontal axis corresponds to the sea floor, while the vertical axis is distance above the sea floor. The region with arcs (10) defines the beam of sonar 12, which is illustrated as the dot located at (0,10). As illustrated in FIG. 1, the spacing between peaks in the arriving sound waves gets closer together as the horizontal range increases.

For purposes herein, grazing angle can be defined as the angle between the sound impinging on the sea floor and the sea floor itself. It is the angle between a ray connecting the sonar to a point on the sea floor, and a ray tangent to the sea floor at that point. When looking at the horizon the grazing angle is zero; when looking straight down the grazing angle is 90 degrees. On a flat bottom at a constant altitude, grazing angle varies with range. At a constant horizontal range, grazing angle changes as the vertical position of the sonar is varied. For a contoured bottom, changes in the bottom slope can also affect the grazing angle.

In order to appreciate the holographic map, an understanding of the frequency domain representation of a sonar image is desirable. Consider the case of a sonar image created in the image plane. The sonar transmits a signal with center frequency $f_0$ and bandwidth $f_{BW}$. Since the frequency varies from $$\left(f_0 - \frac{f_{BW}}{2}\right)$$

to $$\left(f_0 + \frac{f_{BW}}{2}\right),$$

the wavenumber (i.e., the spatial angular frequency) k of the signal varies from $$2\pi\left(f_0 - \frac{f_{BW}}{2}\right)\Big/c$$

to $$2\pi\left(f_0 + \frac{f_{BW}}{2}\right)\Big/c,$$

where c is the speed of count. This can be rewritten as $$\left(k_0 - \frac{k_{BW}}{2}\right)$$

to $$\left(k_0 + \frac{k_{BW}}{2}\right).$$

Because the sound must travel to the scene and back, the wavenumber in the image varies from $$2\left(k_0 - \frac{k_{BW}}{2}\right)$$

to $$2\left(k_0 + \frac{k_{BW}}{2}\right).$$

However, image frequencies are more typically represented in terms of $k_x$ and $k_y$, where $$4k^2 = \sqrt{k_x^2 + k_y^2}.$$

Figure 2:
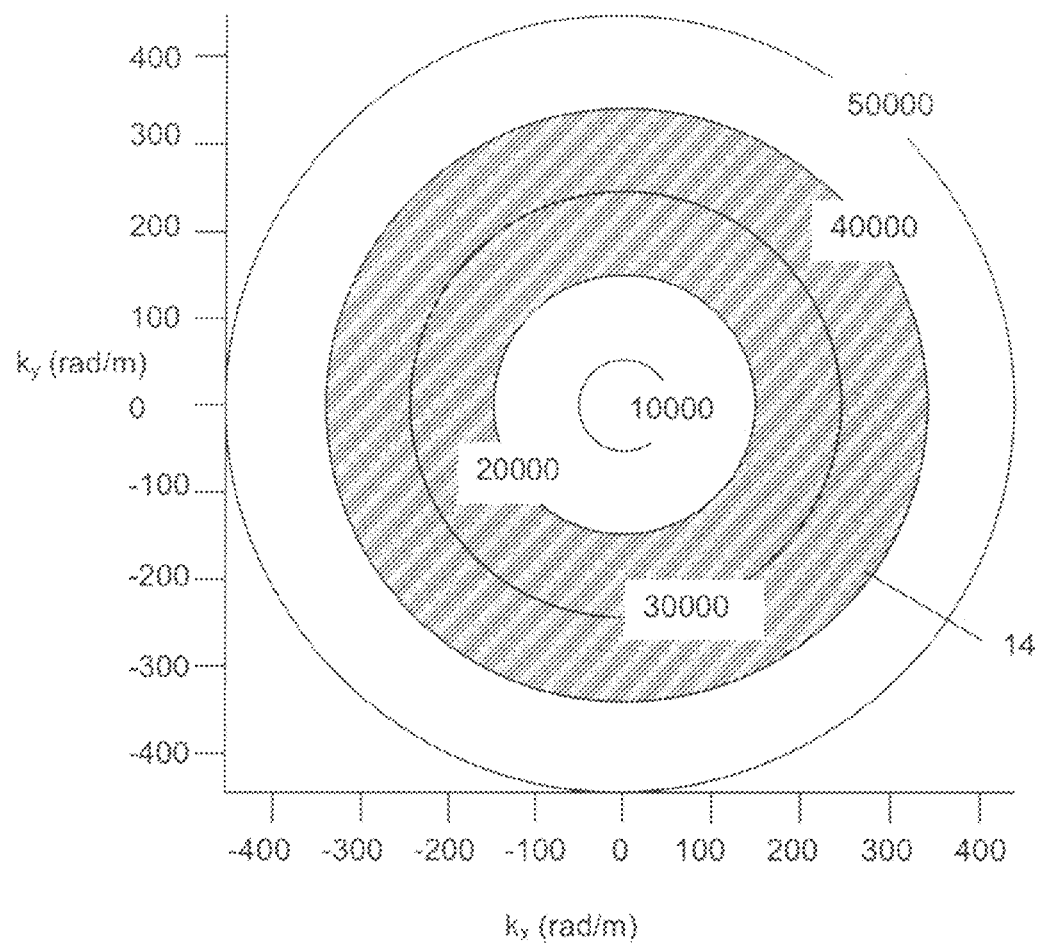
FIG. 2 illustrates the Fourier transform of a scene imaged omni-directionally.

As such, the described frequencies correspond to an annulus in the frequency domain, as shown in FIG. 2.

FIG. 2 illustrates the Fourier transform of a scene imaged omni-directionally with 20-40 kHz. The circular lines correspond to constant signal frequencies, while $k_x$ and $k_y$ correspond to spatial frequencies in the image. The region having right hatching (14) is non-zero, because it corresponds to the frequencies in the signal. Regions without hatching are zero; or approximately zero, as any finite length signal would have some spectral leakage.

If the same scene was imaged with a different sonar signal that lay outside the 20-40 kHz band, the two images would not be correlated. This is because image correlation corresponds to frequency domain multiplication. The frequency domain extent of the annular region is important, since it describes the range of frequencies that can be used with the map. Any frequencies that are not included in the map will be multiplied by zero during the correlation operation and will be of no use.

However, FIG. 2 only describes an image plane image. Image plane images correlate very poorly because geometric relationships are distorted. Two objects spaced 10 centimeters apart in range will be 10 cm apart in the image plane image when viewed on the horizon, but only 7 cm apart when viewed at a grazing angle of 45°. Since the sound has to travel to the scene and back, the scatterers would constructively reinforce a wavelength of 20 cm when viewed on the horizon, but only 14 cm when viewed from 45 degrees.

By rescaling the image by the cosine of the grazing angle, it is possible to shift, the frequencies and create a grazing angle invariant image. However, after rescaling, the frequency band is range varying. This means that the annular region varies spatially. However, this is acceptable.

What is desired is that all possible annular regions after grazing angle compensation contain a common annular region or a common set of spatial frequencies, such that there are always some frequencies that can be used for correlation which are independent of range. After grazing angle compensation there will always be additional frequencies in the image which do not overlap at all ranges. These can be kept as they do not hurt the image, or they can be filtered out. If they are kept, images which are correlated from nearly the same position will have a higher correlation precision.

Figure 3:
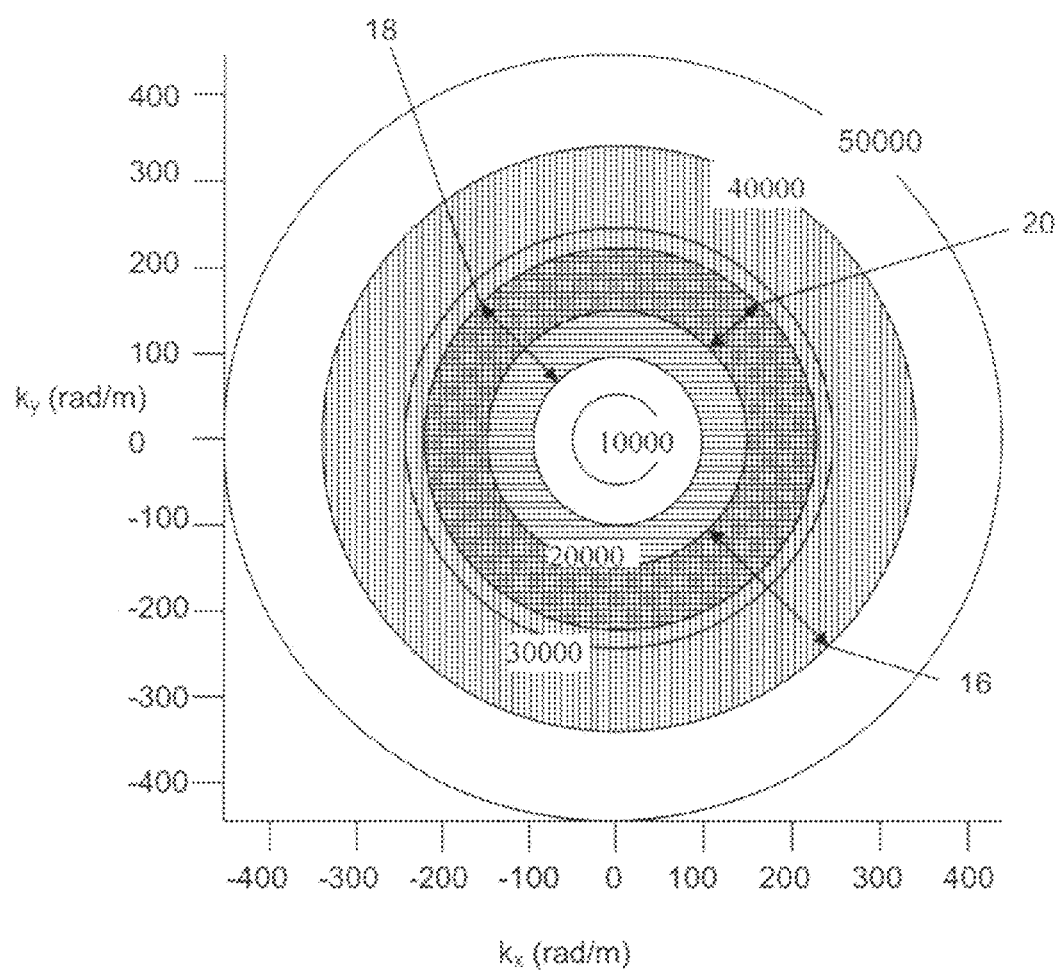
FIG. 3 illustrates the overlap between two signals after grazing angle compensation.

FIG. 3 illustrates the overlap between two signals after grazing angle compensation. It is assumed that a 20-40 kHz signal is used, and that grazing angles from 0° to 45° are used. After grazing angle compensation, the signal extends from 20-40 kHz at 0 degrees (region 16 designated with vertical hatching), but only 14-28 kHz at 45° (region 18 designated with horizontal hatching). At these extremes there is still overlap from 20-28 kHz (region 20 designated with both vertical and horizontal hatching). Therefore, if the entire band is kept and two images are correlated, the minimum spectral overlap in the image would be 8 kHz, and there would be portions of the images with more overlap.

Those of skill in the art will recognize that grazing angle compensation typically breaks down as the grazing angle approaches 90°, i.e., straight down to the sea floor. This results from the frequency being rescaled by dividing by the cosine of the angle. As the grazing angle approaches 90°, the cosine approaches zero and the frequencies approach infinity directly under the sonar. Consequently, there are only a limited range of angles which can be compensated for, meaning that the sonar swath that is included in the map typically has a minimum and maximum grazing angle.

A well designed map has a frequency band that, after grazing angle compensation, describes all locations in the map. However, this is not sufficient to guarantee correlation. The valid range of viewing aspects also must be defined.

Suppose the sonar signal described above with spatial frequencies $$\left(k_0 - \frac{k_{BW}}{2}\right)$$

to $$\left(k_0 + \frac{k_{BW}}{2}\right)$$

is used to observe a target at 0°. In the frequency domain representation of the image, the information about the target will be contained along the line $k_y = k_x \tan \theta$. If the target is viewed from a different angle, the information about the target will lie along a different line in the frequency domain and the signals will not correlate.

If, instead, information about the target is gathered over a range of angles then an entire sector will contain information in the frequency domain. This sector, when multiplied by another sector which overlaps, will yield a non-zero region corresponding to the overlap. This overlap defines the resolution of the correlation.

Figure 4:
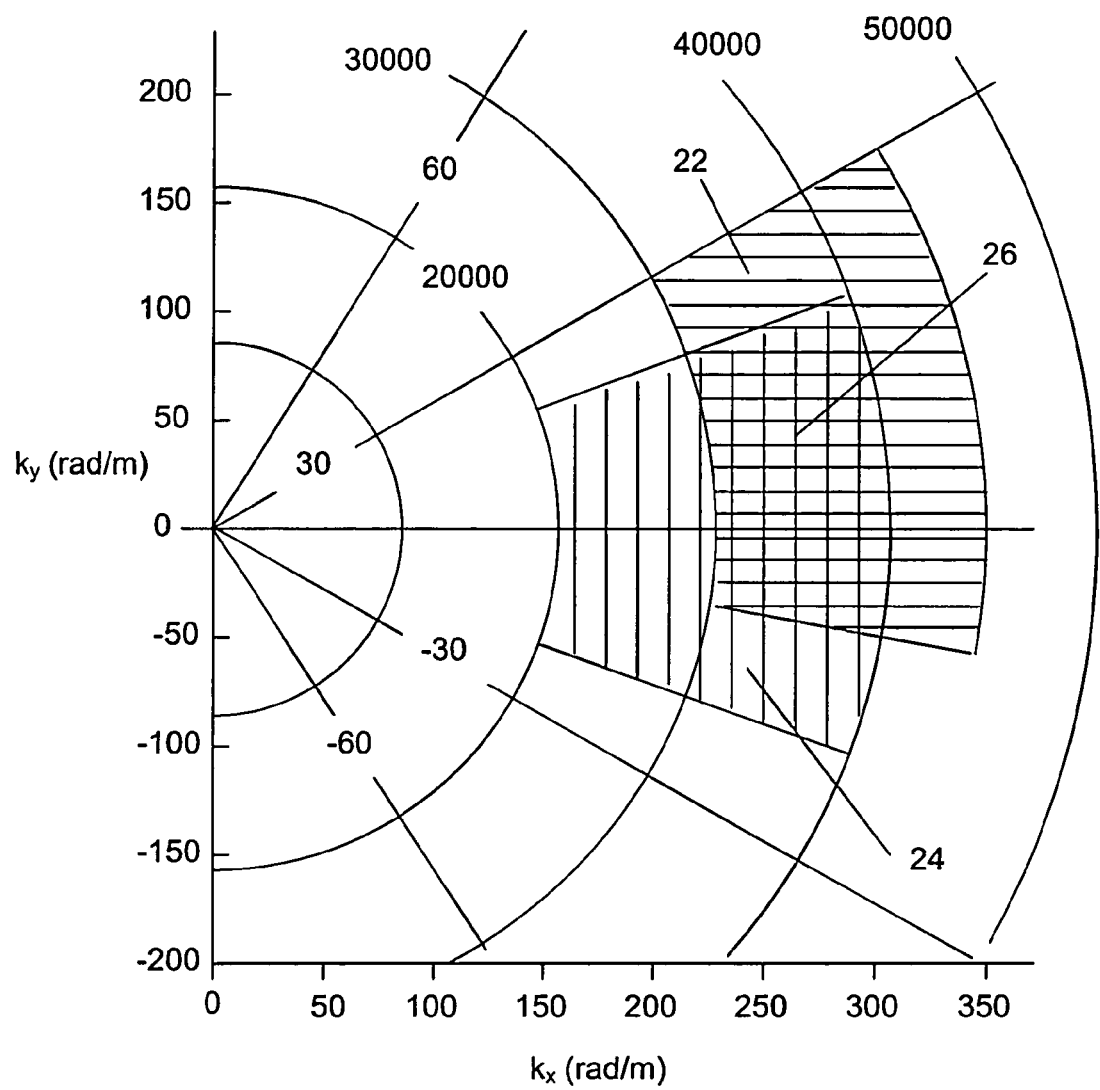
FIG. 4 illustrates the overlap of two holograms with different frequencies and aspects.

FIG. 4 illustrates the overlap of two holograms with different frequencies and aspects. The radial lines are aspect lines and correspond to scene viewing angles. The first hologram (region 22 designated with horizontal hatching) observes the terrain from −10° to 30° with 30-45 kHz. The second hologram (region 24 designated with vertical hatching) observes the terrain from −20° to 20° degrees with 20-40 kHz. The overlapping region (region 26 designated with both horizontal and vertical hatching) is all that is left after correlation, as the right and left hatched regions end up being zero. The resolution of the correlation is defined by the size and shape of the cross hatched region.

Accordingly, a well designed map has both a well defined range of frequencies, and aspects which describe all locations in the map. The map implicitly contains all possible images that can be created at those frequencies and aspects, making it ideal for correlation based navigation.

FIGS. 5A-5C illustrate the necessity for both overlapping, frequency bands and overlapping aspects. FIGS. 5A-5C show synthetic aperture sonar images and spectra of a sunken tugboat. To the eye, FIG. 5A and FIG. 5B appear to be very similar and could be expected to correlate. However, the sonar image in FIG. 5A was formed using 10-50 kHz, while the sonar image in FIG. 5B was formed using 105-135 kHz. FIG. 5C shows the two dimensional Fourier transforms of the images. The circles in FIG. 5C represent frequency increments and the radial lines correspond to target aspects. Although the images contain overlapping aspects, they do not contain overlapping frequency bands. Accordingly they cannot be coherently correlated.

The ideal holographic map has, after grazing angle compensation, a frequency domain extent with a fixed range of frequencies and a fixed range of aspect angles. This is ideal because holograms can be neatly combined to form the circular spectrums shown in FIGS. 2 and 3. Closed aperture holograms, with frequency content comparable to that shown in FIGS. 2 and 3, have the highest possible resolution for a given range of frequencies.

Most sonar transmitters do not transmit all frequencies over the same angles. Typically, most transmitters have a constant aperture, meaning that their beam pattern narrows as frequency increases, i.e., the higher frequencies have a narrower range of angles, and the lower frequencies a wider range of angles.

However, by observing the targets over a wider range of angles for low frequencies and a narrower range of angles for high frequencies, the aperture used for mapping is frequency varying. As it turns out, these two effects conspire to result in a range invariant spatial resolution in mapping a target. This means, in turn, that spatial bandwidth in the sonar image may be independent of frequency.

Figure 6:
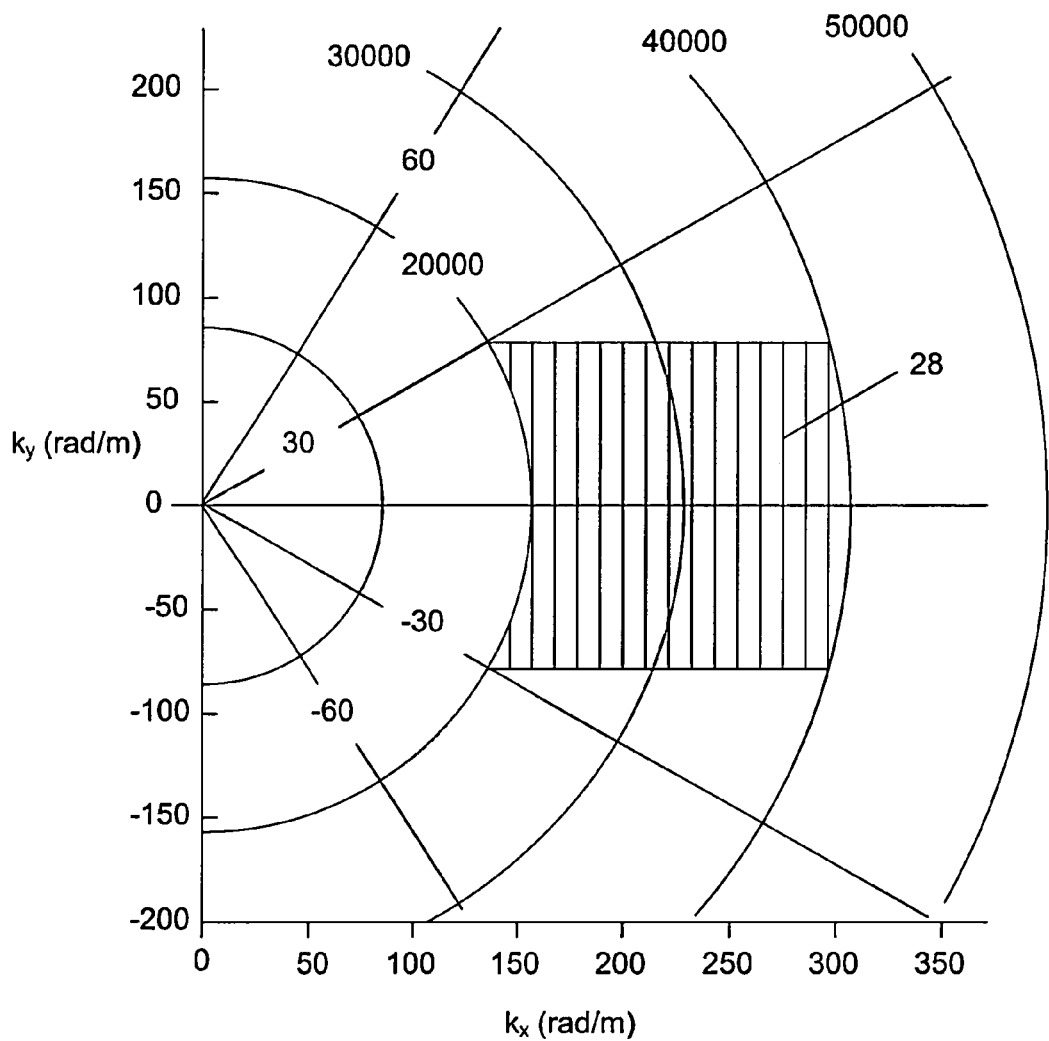
FIG. 6 illustrates the beam pattern narrowing of a constant aperture sonar.

The spectral representation shown in FIG. 5C illustrates this effect. Both frequency bands shown in FIG. 5C illustrate beam pattern narrowing as frequency increases. FIG. 6 illustrates the beam pattern narrowing of a constant aperture sonar more clearly. The sonar for the hologram illustrated in FIG. 6 observes the terrain from −30° to 30° with 20-40 kHz. However, instead of fanning out along the −30° and 30° radial lines (comparable to the holograms of FIG. 4), at 40 kHz, the hologram spans only from about −15° to 15° (region 28 designated with vertical hatching). If these sorts of holograms are combined to form larger apertures, there will either be holes in the combined aperture at higher frequencies or significantly more overlap at lower frequencies.

Figure 7:
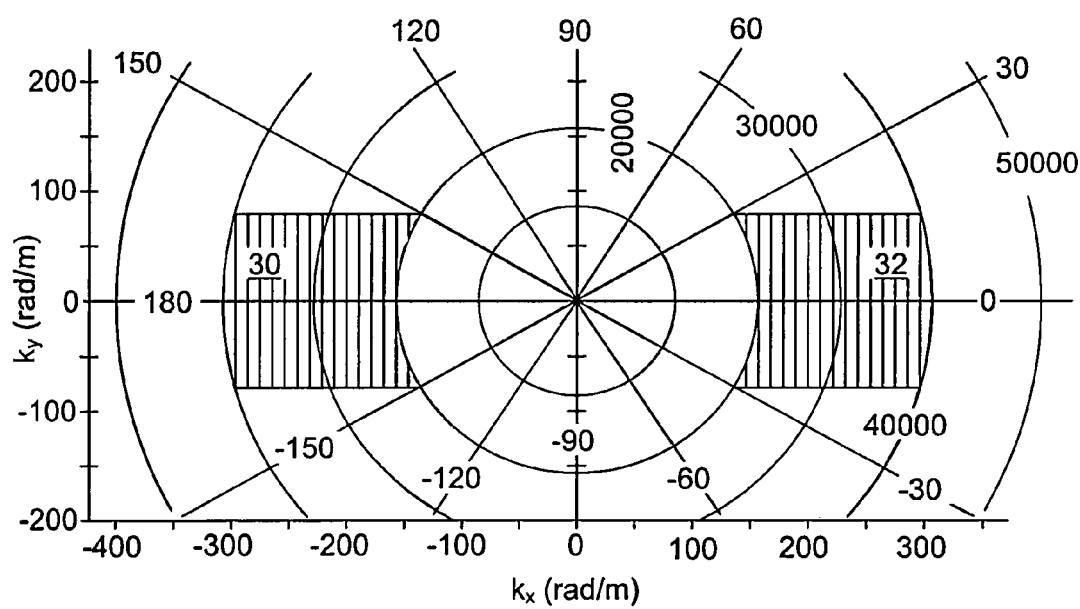
FIG. 7 illustrates the Fourier transform of a scene surveyed by a vehicle with a broadside SAS that maps to port and starboard.

FIG. 7 illustrates a hologram for an area surveyed by a vehicle with a broadside SAS that maps to port (region 30) and starboard (region 32). The port and starboard sonars will observe the scene from different aspects, in this case separated by 180°. The port and starboard images occupy different portions of the frequency domain.

Therefore, a system which uses this style of map for navigation will need to account for the local aspect direction of the map. Where they appear in a globally referenced frequency domain will depend on the vehicle heading, but unless a re-acquisition sonar has an incredibly broad beam, or can look in opposite directions at the same time, it will only be able to correlate its imagery with one of the images at a time.

Figure 8:
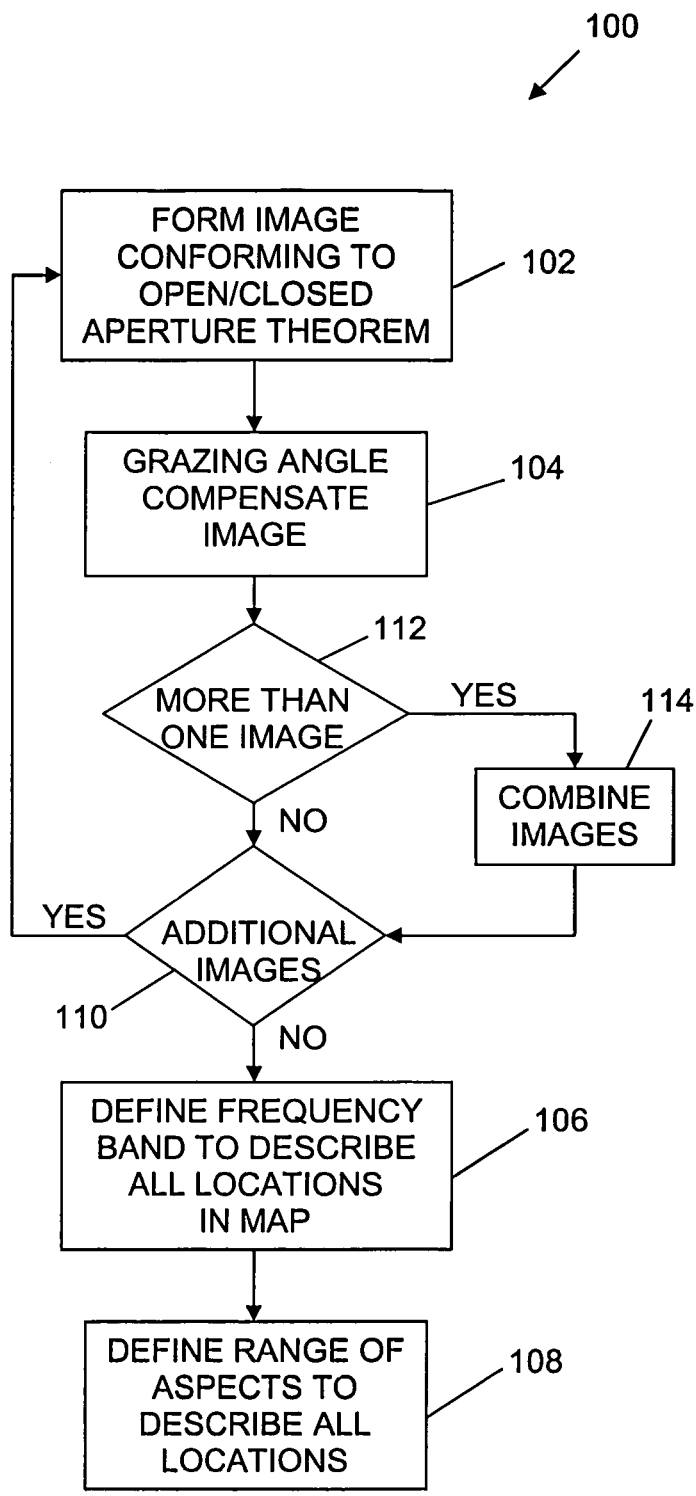
FIG. 8 is a block diagram of a method of forming a holographic map.

FIG. 8 is a block diagram of a method 100 for forming a holographic map. In accordance with the foregoing discussion, an image conforming to the open/closed aperture theorem is formed at block 102. The image may be formed using broadside, squinted, or circular SAS. The image is grazing angle compensated at block 104.

In order to be of use as a holographic map, the frequency band of the image and the range of aspects of the image are defined at blocks 106 and 108, respectively, such that they describe all locations in the holographic map. As previously described herein, this map definition provides the criteria for correlating other images with the map.

Optionally, a number of images can be formed, as determined at block 110. If there is more than one image, as determined at block 112, the images can be combined (block 114) to increase the coverage area, frequency band, and/or range of aspects of the holographic map. Combining can be in the form of overlaying images, or mosaicking images.

Holographic maps have many applications. Primarily, they are intended for use in holographic navigation. In holographic navigation, terrain is recognized using real or synthetic aperture images. Holographic maps also may be of use for multi-image focusing. The simplest case of this involves two holograms, each constituting a separate map of the area.

First, the individual signals used to form the second image are correlated with the first image to estimate their location. This is done to best estimate the gaps between the real apertures. This error can be corrected for in the second hologram. Then, the signals used to create the first hologram are compared with the new second image, the array gaps are estimated, and the first hologram (SAS image) is corrected. Then, if desired, they can be combined or mosaicked.

Additional applications include multi-pass interferometry, wherein phase differences between two holograms formed from different locations are used to determine bottom relief. Also, a holographic map is ideal for change detection due to its correlation properties. A prior hologram can be correlated against one or more new images or holograms, and regions that exhibit sudden de-correlation can be flagged.

Additionally, holographic maps can be used for map maintenance. In this scenario, a high-resolution sonar system, such as a synthetic aperture sonar, forms a hologram of terrain in an area of interest. By correlating real aperture sonar signals with the hologram, maintenance robots are able to position themselves with high accuracy. These well-positioned robots then use their signals to re-image the terrain or add to the existing scene. If a change is detected, the robots can form synthetic apertures, possibly closed apertures, around the object of interest to form the highest quality imagery to best aid a decision maker.

Obviously many modifications and variations of the present invention may become apparent in light of the above teachings. It will be understood that many additional changes in details, materials, and arrangements of parts which have been described herein and illustrated in order to explain the nature of the invention, may be made by those skilled in the art.

What is claimed is:

1. A non-transitory computer-readable medium with instructions stored thereon to create a holographic map, comprising:
   at least one open/closed aperture theorem conforming image, wherein:
   an aperture subtends a solid angle with a point located at a distance from said aperture;
   an amount of radiation from said point incident on substantially each position on said aperture is weighted by a cosine of an angle formed between a position vector from said each position to said point and a vector normal to said aperture at said each position, effective to form said at least one image;
   said at least one image is grazing angle compensated; and
   a frequency band and range of aspects of said at least one image describe all locations in said holographic map.

2. The holographic map of claim 1, wherein said at least one image is formed by a synthetic aperture sonar.

3. The holographic map of claim 2, wherein said at least one image is formed by at least one of a broadside, a squinted and a circular synthetic aperture sonar.

4. The holographic map of claim 1, wherein said at least one image comprises at least one of a plurality of distinct holograms and a mosaicked hologram.

5. A method of generating a holographic map, comprising the steps of:
   deploying an aperture located at a distance from a point, said aperture subtending a first solid angle with said point;
   weighting an amount of radiation incident on substantially each position on said aperture by a cosine of an angle between a position vector from said each position to said point and a vector normal to said aperture at said each position;
   forming an open/closed aperture theorem conforming image based on said weighting;
   compensating said image for grazing angle;
   defining a frequency band of said image to describe all locations in said holographic map; and
   defining a range of aspects of said image to describe all locations in said holographic map.

6. The method of claim 5, wherein forming said image comprises imaging a scene with a synthetic aperture sonar.

7. The method of claim 5, further comprising the steps of:
forming a plurality of said images; and
combining said plurality of images.

8. The method of claim 7, wherein combining further comprises mosaicking said plurality of images.

* * * * *